United States Patent
Murai

(10) Patent No.: US 11,769,635 B2
(45) Date of Patent: Sep. 26, 2023

(54) MULTILAYER CERAMIC CAPACITOR AND METHOD OF MANUFACTURING SAME

(71) Applicant: TAIYO YUDEN CO., LTD., Tokyo (JP)

(72) Inventor: Wakaaki Murai, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 106 days.

(21) Appl. No.: 17/552,341

(22) Filed: Dec. 15, 2021

(65) Prior Publication Data

US 2022/0189701 A1 Jun. 16, 2022

(30) Foreign Application Priority Data

Dec. 16, 2020 (JP) .................... 2020-208623

(51) Int. Cl.
```
H01G 4/30      (2006.01)
H01G 4/012     (2006.01)
H01G 2/06      (2006.01)
H01G 4/12      (2006.01)
H01G 4/008     (2006.01)
```
(52) U.S. Cl.
CPC ............ *H01G 4/30* (2013.01); *H01G 2/065* (2013.01); *H01G 4/008* (2013.01); *H01G 4/012* (2013.01); *H01G 4/1209* (2013.01)

(58) Field of Classification Search
CPC .......... H01G 4/30; H01G 2/065; H01G 4/008; H01G 4/012; H01G 4/1209
See application file for complete search history.

(56) References Cited

U.S. PATENT DOCUMENTS

| 6,366,444 | B1* | 4/2002 | Yagi | ............ | H10N 30/877 |
| | | | | | 361/321.1 |
| 2011/0110014 | A1* | 5/2011 | Hirata | ............ | H01G 4/30 |
| | | | | | 156/89.12 |
| 2013/0049532 | A1* | 2/2013 | Kim | ............ | H01C 7/18 |
| | | | | | 361/321.1 |
| 2014/0254063 | A1* | 9/2014 | Konishi | ............ | H01G 4/30 |
| | | | | | 361/301.4 |

(Continued)

FOREIGN PATENT DOCUMENTS

| JP | 2004-311985 A | 11/2004 |
| JP | 2008-258190 A | 10/2008 |

*Primary Examiner* — Michael P McFadden
(74) *Attorney, Agent, or Firm* — CHEN YOSHIMURA LLP

(57) ABSTRACT

A multilayer ceramic capacitor includes an element body. The element body includes a stack of first internal electrode layers, dielectric layers and second internal electrode layers. The element body has a first surface and a second surface opposite the first surface. The multilayer ceramic capacitor also includes a first external electrode formed on the first surface of the element body and a second external electrode formed on the second surface of the element body. The first internal electrode layer has a first current path extending in a first plane perpendicular to the first surface such that the first current path has a shorter component on the first plane in a first direction toward the first surface than in a second direction perpendicular to the first direction. The second internal electrode layer has a second current path that possesses a similar anisotropy to the first internal electrode layer.

20 Claims, 12 Drawing Sheets

(56) References Cited

U.S. PATENT DOCUMENTS

| | | | |
|---|---|---|---|
| 2014/0376150 A1* | 12/2014 | Kim | H01G 4/30 |
| | | | 361/301.4 |
| 2015/0155100 A1* | 6/2015 | Morita | H01G 4/012 |
| | | | 361/301.4 |
| 2016/0329151 A1* | 11/2016 | Ishida | H01G 4/30 |
| 2018/0068790 A1* | 3/2018 | Chigira | H01G 4/12 |
| 2018/0174756 A1* | 6/2018 | Shin | C04B 35/4682 |

* cited by examiner

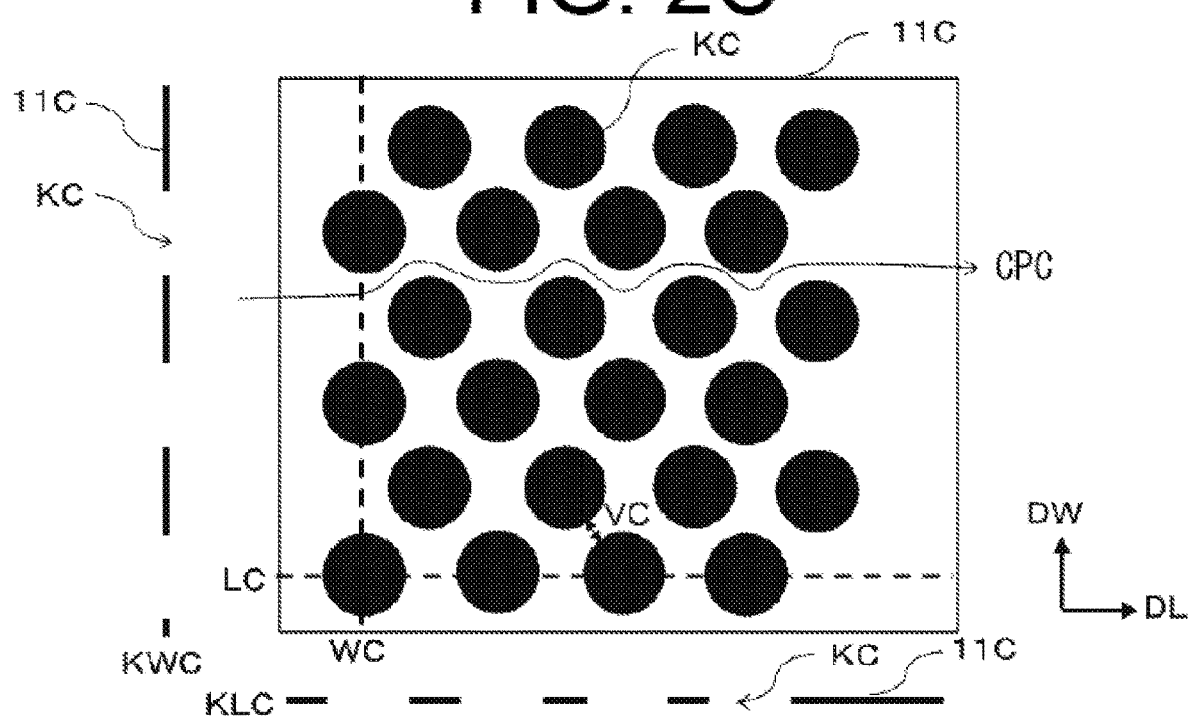

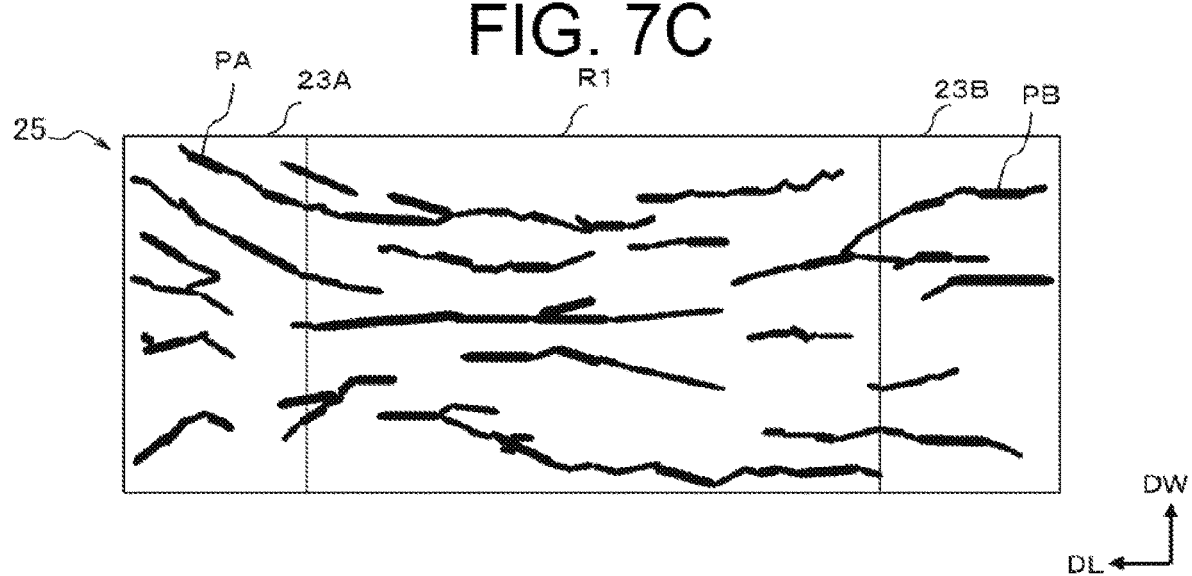

MULTILAYER CERAMIC CAPACITOR AND METHOD OF MANUFACTURING SAME

FIELD OF THE INVENTION

The present invention relates to a multilayer ceramic capacitor and a method of manufacturing the multilayer ceramic capacitor.

BACKGROUND OF THE INVENTION

With size reduction and high functionality of an electronic device, there is a demand to reduce the height of a multilayer ceramic capacitor disposed in the electronic device while increasing the capacitance of the capacitor. To meet such demand, there is a method of increasing the number of stacked internal electrodes in the multilayer ceramic capacitor while thinning the internal electrodes.

JP-A-2004-311985 discloses an arrangement that prevents the falling apart of the internal electrode layer due to spheroidization during the process of forming the internal electrode layer. Specifically, an internal electrode main layer made from the base metal and ceramic particles included in the internal electrode main layer constitute, in combination, a composite structure to prevent the internal electrode layer from falling apart.

JP-A-2008-258190 discloses an arrangement that improves mechanical strength of a multilayer electronic component. Specifically, inner electrode layers and dielectric layers are alternately laminated, and needle-shaped crystals penetrate weak portions of the inner electrode layers such that the needle-shaped crystals bridge to the dielectric layers to prevent the falling apart of the inner electrode layers.

SUMMARY OF THE INVENTION

In the structure in which the inner electrode layers and the dielectric layers are laminated alternately, the inner electrode layers may be broken due to the difference in material between the inner electrode layer and the dielectric layer. This sometimes increases an ESR (equivalent series resistance) in the direction toward the outer electrode from the inner electrode layer.

An objective of the present invention is to provide a multilayer ceramic capacitor capable of suppressing an increase in the equivalent series resistance in a direction toward the outer electrode from the inner electrode layer. Another objective of the present invention is to provide a method of manufacturing such multilayer ceramic capacitor.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multilayer ceramic capacitor that includes an element body. The element body includes at least one first internal electrode layer, at least one second internal electrode layer, and at least one dielectric layer situated between the first internal electrode layer(s) and the second internal electrode layer(s). The element body has a plurality of surfaces. The surfaces include a first surface and a second surface opposite the first surface. The multilayer ceramic capacitor also includes a first external electrode formed on the first surface of the element body and connected to the first internal electrode layer(s). The multilayer ceramic capacitor also includes a second external electrode formed on the second surface of the element body and connected to the second internal electrode layer(s). The first internal electrode layer has a first end exposed in the first surface and has a first current path extending in a first plane perpendicular to the first surface such that the first current path has a shorter component on the first plane in a first direction toward the first surface than in a second direction perpendicular to the first direction. The second internal electrode layer has a second end exposed in the second surface and has a second current path extending in a second plane perpendicular to the second surface such that the second current path has a shorter component on the second plane in a third direction toward the second surface than in a fourth direction perpendicular to the third direction.

In another aspect, the present disclosure provides a multilayer ceramic capacitor that includes an element body. The element body includes at least one first internal electrode layer, at least one second internal electrode layer, and at least one dielectric layer situated between the first internal electrode layer(s) and the second internal electrode layer(s). The element body has a plurality of surfaces. The surfaces include a first surface and a second surface opposite the first surface. The multilayer ceramic capacitor also includes a first external electrode formed on the first surface of the element body and connected to the first internal electrode. The multilayer ceramic capacitor also includes a second external electrode formed on the second surface of the element body and connected to the second internal electrode. The first internal electrode layer has a first end exposed in the first surface and extends in a first plane perpendicular to the first surface such that each of the first internal electrode has a greater continuity rate in a first direction toward the first surface than in a second direction perpendicular to the first direction. The second internal electrode layer has a second end exposed in the second surface and extends in a second plane perpendicular to the second surface such that each of the second internal electrode has a greater continuity rate in a third direction toward the second surface than in a fourth direction perpendicular to the third direction.

The continuity rate of the first internal electrode layer in the first direction may be equal to or greater than 80% but less than 100%. The continuity rate of the second internal electrode layer in the third direction may be equal to or greater than 80% but less than 100%. The continuity rate of the first internal electrode layer in the second direction may be between 70% and 90%. The continuity rate of the second internal electrode layer in the fourth direction may be between 70% and 90%.

The continuity rate of the first internal electrode layer in the first direction may be 1.1-1.4 times greater than the continuity rate of the first internal electrode layer in the second direction. The continuity rate of the second internal electrode layer in the third direction may be 1.1-1.4 times greater than the continuity rate of the second internal electrode layer in the fourth direction.

The continuity rate of the first internal electrode layer in the first direction may be an average value of a plurality of continuity rates obtained along a plurality of parallel lines on the first plane in the first direction. The continuity rate of the first internal electrode layer in the second direction may be an average value of a plurality of continuity rates obtained along a plurality of parallel lines on the first plane in the second direction. The continuity rate of the second internal electrode layer in the third direction may be an average value of a plurality of continuity rates obtained along a plurality of parallel lines on the second plane in the third direction. The continuity rate of the second internal electrode layer in the fourth direction may be an average value of a plurality of continuity rates obtained along a plurality of parallel lines on the second plane in the fourth direction.

The first internal electrode layer may include at least one first fractured portion that factures toward the first surface. The second internal electrode layer may include at least one second fractured portion that fractures toward the second surface.

The number of gaps formed in the first internal electrode layer in a first region having a predetermined size in the first direction on the first plane may be less than the number of gaps formed in the first internal electrode layer in a second region having the predetermined size in the second direction on the first plane. The number of gaps formed in the second internal electrode layer in a third region having the predetermined size in the third direction on the second plane may be less than the number of gaps formed in the second internal electrode layer in a fourth region having the predetermined size in the fourth direction on the second plane.

The first internal electrode layer may contain no ceramic component. The second internal electrode layer may contain no ceramic component.

The first internal electrode layer may be composed of a single metal or alloy. The second internal electrode layer may be composed of a single metal or alloy.

The first internal electrode layer may be a sputtered film. The second internal electrode layer may be a sputtered film.

The thickness of the first internal electrode layer may be in a range from 0.05 µm to 0.5 µm. The thickness of the second internal electrode layer may be in a range from 0.05 µm to 0.5 µm.

A main component of the dielectric layer may be an oxide ceramic.

The dielectric layer may be a sintered body of a coating film.

In still another aspect, the present disclosure provides a method of manufacturing a multilayer ceramic capacitor. The method includes applying a dielectric slurry film on a carrier film. The method also includes forming at least one electrode pattern on the dielectric slurry film to make a green sheet that includes the electrode pattern(s), the dielectric slurry film and the carrier film. The method also includes preparing a plurality of green sheets, and stacking the green sheets to make a green sheet block. The method also includes compressing the green sheet block in a stacking direction of the green sheets such that an elongation ratio of the green sheet block has anisotropy in a plane defined in the green sheet block. The method also includes dividing the compressed green sheet block into a plurality of sub-blocks such that each of the sub-blocks becomes an element body of a multilayer ceramic capacitor and an end of the electrode pattern is exposed from the dielectric slurry film of the element body. The method also includes applying a conductive paste on the element body. The conductive paste will become an underlayer that contacts the end of the electrode pattern. The method also includes sintering the element body that has the conductive paste applied thereon, such that the electrode pattern is integrated with the dielectric slurry film and the underlayer is integrated with the element body. The method also includes forming a plating layer on the underlayer.

The step of forming at least one electrode pattern may be carried out by sputtering.

The green sheet block may include a first region, a second region and a third region. In the first region, the dielectric slurry films and the electrode pattern may be alternately stacked. In the second region, a set of the dielectric slurry film, the electrode pattern, the dielectric slurry film and a vacant layer may be repeatedly stacked, In third region, the dielectric slurry films and the vacant layers may be alternately stacked.

The step of compressing the green sheet block may be carried out by a hydrostatic pressing machine. A pressure applied to the second region by the hydrostatic pressing machine may be greater than a pressure applied to the third region.

An elongation rate of the dielectric slurry film toward the third region from the first region may be greater than an elongation rate of the dielectric slurry film toward the second region from the first region. At least one fractured portion may be produced in the electrode pattern based on elongation of the dielectric slurry film.

The end of the internal electrode layer may be exposed from the dielectric slurry film in the second region and may be connected to the underlayer.

A continuity rate of the internal electrode layer extending from the first region to the second region may be larger than a continuity rate of the internal electrode layer extending from the first region to the third region.

According to the present invention, it is possible to suppress an increase in the equivalent series resistance in the direction toward the outer electrode from the inner electrode layer of the multilayer ceramic capacitor.

It is to be understood that both the foregoing general description and the following detailed description are exemplary and explanatory, and are intended to provide further explanation of the invention as claimed.

BRIEF DESCRIPTION OF THE DRAWINGS

FIG. 2C is a plan view showing an example of a current path when the continuity rate in the length direction of the inner electrode is smaller than the continuity rate in the width direction.

FIG. 7C is a plan view showing the inner electrode pattern in the charge accumulating portion and the electrode lead-out portions of FIG. 7A after the hydrostatic pressing.

DESCRIPTION OF THE EMBODIMENTS

Embodiments of the present invention will be described in detail with reference to the accompanying drawings. The following embodiments do not limit the scope of the invention. Not all combinations of features described in the embodiments may be essential to the invention. The embodiments may be modified or changed depending on the specifications of the device to which the invention is applied and various conditions (usage conditions, usage environment, etc.). The technical scope of the present invention is defined by the claims and is not limited by the following individual embodiments. The drawings used conjunction with the following description may differ in scale and shape from the actual structure in order to make each configuration easier to understand.

First Embodiment

Figure 1A:
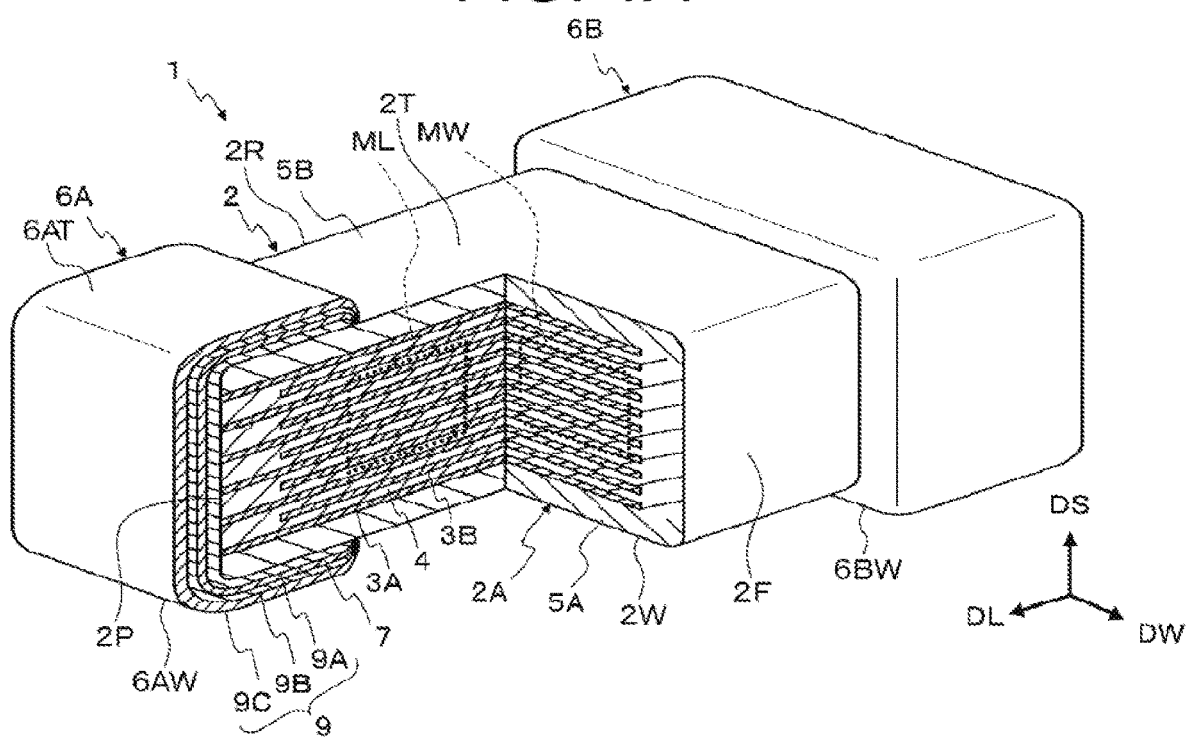
FIG. 1A is a perspective view showing an exemplary configuration of a multilayer ceramic capacitor according to a first embodiment of the present invention.
Figure 1B:
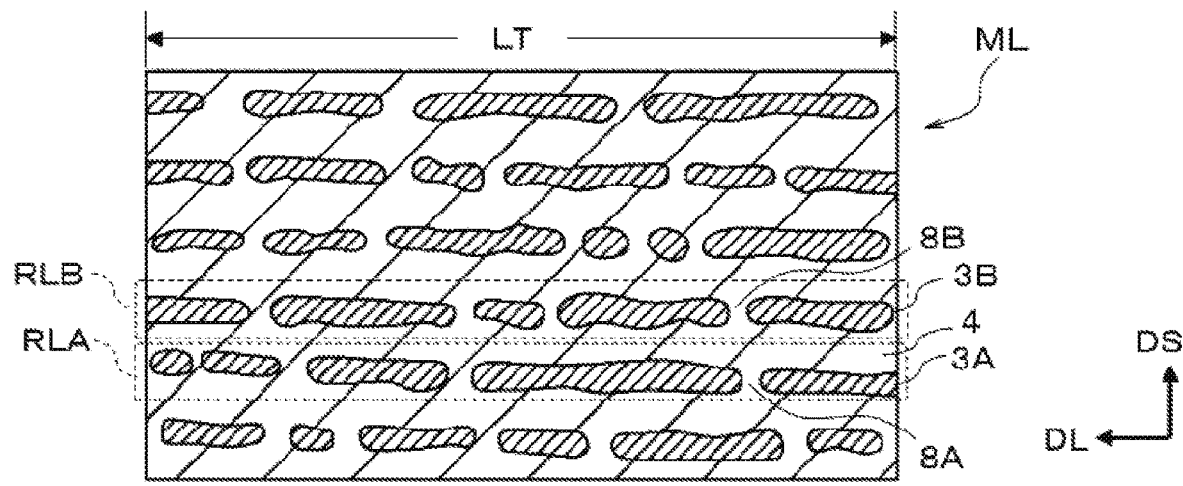
FIG. 1B is a cross-sectional view of a certain portion of the multilayer ceramic capacitor shown in FIG. 1A, taken in a longitudinal direction of the capacitor.
Figure 1C:
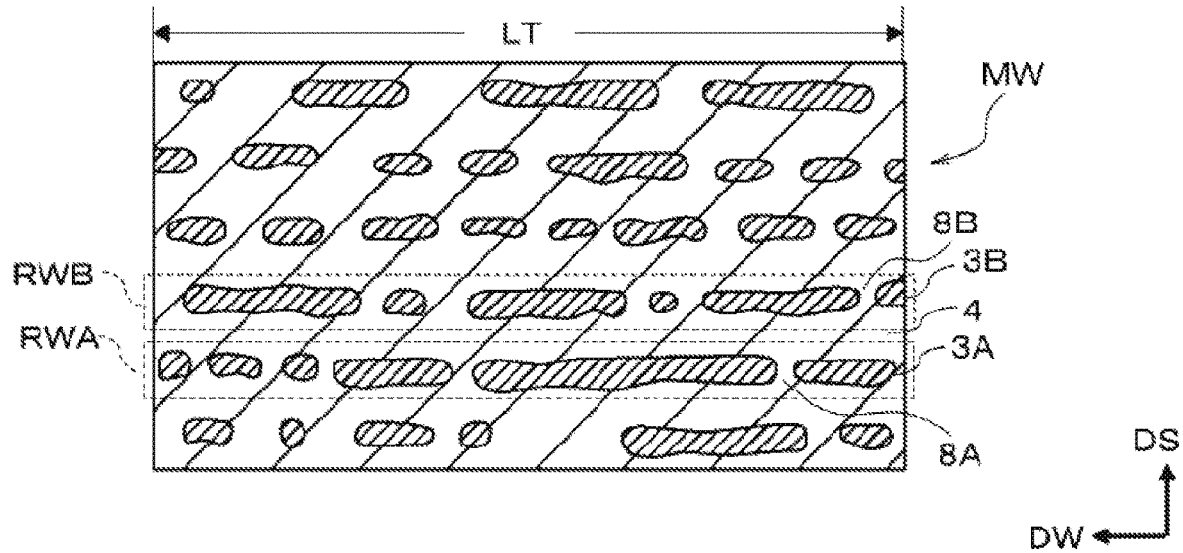
FIG. 1C is a cross-sectional view of another portion of the multilayer ceramic capacitor shown in FIG. 1A, taken in a width direction of the capacitor.

FIG. 1A is a perspective view showing a configuration example of a multilayer ceramic capacitor 1 according to a first embodiment of the present invention. FIG. 1B is a cross-sectional view of the multilayer ceramic capacitor 1 shown in FIG. 1A taken in a length direction of the capacitor 1 and illustrates an exemplary configuration of inner electrodes in an area ML of FIG. 1A. FIG. 1C is another cross-sectional view of the multilayer ceramic capacitor 1 shown in FIG. 1A taken in a width direction of the capacitor 1 and illustrates a configuration example of the inner electrodes in an area MW of FIG. 1A. The inner electrode may be referred to as an internal electrode in the following description.

As shown in FIG. 1A to FIG. 1C, the multilayer ceramic capacitor 1 includes an element body 2, a left external electrode 6A and a right external electrode 6B. The element body 2 includes a laminate 2A, a lower cover layer 5A, and an upper cover layer 5B. The laminate 2A includes inner electrode layers 3A, 3B and dielectric layers 4. The external electrode may be referred to as an outer electrode in the following description.

The lower cover layer 5A is provided under the laminate 2A. The upper cover layer 5B is provided on top of the laminate 2A. The inner electrode layers 3A and 3B are alternately laminated via the dielectric layers 4. In FIG. 1A, six internal electrode layers 3A and five internal electrode layers 3B are stacked, but the number of internal electrode layers 3A and 3B is not limited to six and five, respectively. The shape of the element body 2 is substantially rectangular parallelepiped and the shape of the laminate 2A is substantially rectangular parallelepiped. The element body 2 may be chamfered along ridges of the element body 2. In the following description, a longitudinal direction of the element body 2 is designated by DL, and may be referred to a length direction. The length direction DL is the right-left direction in FIG. 1A. Two opposite surfaces of the element body 2 in the length direction DL are a left surface 2P and a right surface 2Q (FIG. 5F) of the element body 2. The width direction of the element body 2 is designated by DW. The element body 2 has a front face 2F and a rear face 2R in the width direction. The height direction of the element body 2 is designated by DS, and may be referred to as a stacking direction. The top surface of the element body 2 is designated by 2T and the bottom surface of the element body 2 is designated by 2W.

The external electrodes 6A and 6B are formed on the element body 2 such that the external electrode 6A is spaced from the external electrode 6B in the longitudinal direction DL. The left external electrode 6A is formed on the left side surface 2P of the element body 2 and extends over certain areas of the front surface 2F, the rear surface 2R, the top surface 2T and the bottom surface 2W. The right external electrode 6B is formed on the right side surface 2Q of the element body 2 and extends over certain areas of the front surface 2F, the rear surface 2R, the top surface 2T and the bottom surface 2W. A bottom face 6AW of the external electrode 6A and a bottom face 6BW of the external electrode 6B will be joined to a mounting substrate or a motherboard (not shown) by soldering when the capacitor 1 is mounted on the mounting substrate.

In the length direction DL of the element body 2, the internal electrode layers 3A and 3B are alternately arranged at different positions in the laminate 2A. Specifically, when compared to the internal electrode layers 3B, the internal electrode layers 3A are arranged on the left side of the element body 2, i.e., the internal electrode layers 3A extend in the length direction DL from the left side surface 2P of the element body toward the right side surface 2Q. The internal electrode layers 3B are arranged on the right side of the element body 2, i.e., the internal electrode layer 3B extend in the length direction DL from the right side surface 2Q toward the left side surface 2P. The left end of each of the internal electrode layers 3A is exposed at the left side surface 2P of the element body 2 (i.e., the left ends of the internal electrode layers 3A are exposed from the dielectric layers 4) and is connected to the external electrode 6A. The right end of each of the internal electrode layers 3B is exposed at the right side surface 2Q of the element body 2 and is connected to the external electrode 6B. The left side surface 2P may be referred to as a first surface of the element body 2, and the right side surface 2Q may be referred to as a second surface of the element body 2.

In the width direction DW of the element body 2, the ends of the inner electrode layers 3A and 3B are covered with the dielectric layers 4. In the width direction DW, the ends of the inner electrode layers 3A and 3B may be aligned with each other.

Each of the inner electrode layers 3A has anisotropy such that the current path of the layer 3A in the direction DL (direction toward the first surface 2P) is shorter than the current path in the direction DW (direction perpendicular to the direction DL in the same plane). Similarly, each of the inner electrode layers 3B has anisotropy such that the current path of the layer 3B in the direction DL (direction toward the second surface 2Q) is shorter than the current path in the direction DW (direction perpendicular to the direction DL in the same plane). The anisotropy of each inner electrode layer 3A, 3B may be defined by the number of gaps in the layer concerned. Alternatively, the anisotropy of each inner electrode layer 3A, 3B may be defined by the continuity rate in the layer concerned, the fracture direction of the layer concerned, or the resistivity of the layer concerned.

FIG. 1B shows a cross-sectional view of a region ML of the element body 2, taken along the longitudinal direction DL of the element body 2. As shown in FIG. 1B, each of the inner electrode layers 3A has gaps 8A and each of the inner electrode layers 3B has gaps 8B in the region ML. Shaded segments represent metal portions. One of the inner electrode layers 3A is indicated by RLA, and one of the inner electrode layers 3B is indicated by RLB. The region ML has a length LT. FIG. 1C shows a cross-sectional view of a region MW of the element body 2, taken along the width direction DW of the element body 2. One of the inner electrode layers 3A is indicated by RWA, and one of the inner electrode layers 3B is indicated by RWB. The region MW has the same length LT as the region ML. As shown in FIG. 1C, each of the inner electrode layers 3A has the gaps 8A and each of the inner electrode layers 3B has the gaps 8B in the region MW. The number of the gaps 8A of the inner electrode layer 3A in the region RLA is less than the number of the gaps 8A of the inner electrode layer 3A in the region RWA. Similarly, the number of the gaps 8B of the inner electrode layer 3B in the region RLB is less than the number of the gaps 8B of the inner electrode layer 3B in the region RWB.

Therefore, the continuity rate of each of the internal electrode layers 3A in the length direction DL of the element body 2 is larger than the continuity rate of the internal electrode layer 3A in the width direction DW, and the continuity rate of each of the internal electrode layers 3B in the length direction DL of the element body 2 is larger than the continuity rate of the internal electrode layer 3B in the width direction DW. The continuity rate of each internal electrode layer 3A, 3B may be, for example, a ratio of the sum of the lengths of the metallic portions of each internal electrode layer 3A, 3B to the predetermined length LT of the region ML, MW.

The continuity rate of the inner electrode layer 3A, 3B in the lengthwise direction DL of the element body 2 is preferably 80% or more and less than 100%. The continuity rate of the inner electrode layer 3A, 3B in the widthwise direction DW of the element body 2 is preferably between 70% and 90%. The continuity rate of the internal electrode layer 3A, 3B in the length direction DL of the element body 2 can be 1.1 times or more and 1.4 times or less of the continuity rate of the internal electrode layer 3A, 3B in the width direction DW of the element body 2.

The resistivity of each of the inner electrode layers 3A in the length direction DL of the element body 2 may be smaller than the resistivity of the inner electrode layer 3A in the width direction DW of the element body 2. The resistivity of each of the inner electrode layers 3B in the length direction DL of the element body 2 may be smaller than the resistivity of the inner electrode layer 3B in the width direction DW of the element body 2. That is, the sheet resistance of each of the inner electrode layers has anisotropy in that the sheet resistance is smaller in the length direction DL than in the width direction DW. The component of fracture of the internal electrode layer 3A, 3B in the longitudinal direction DL may be greater than the component of fracture of the internal electrode layer 3A, 3B in the width direction DW. Each of the factures generally extends in the longitudinal direction DL. In other words, each fracture extends more in the longitudinal direction DL than in the width direction DW.

The thickness of each of the internal electrode layers 3A and 3B in the stacking direction DS may be within the range from 0.05 μm to 5 μm. Preferably, the inner electrode layers 3A and 3B do not contain a ceramic component. The material of the inner electrode layers 3A and 3B may be, for example, a metal such as Cu (copper), Ni (nickel), Ti (titanium), Ag (silver), Au (gold), Pt (platinum), Pd (palladium), Ta (tantalum) or W (tungsten), or may be an alloy containing these metals. Preferably, each of the inner electrode layers 3A and 3B is composed of a single metal or alloy. Each of the inner electrodes 3A and 3B may be formed of, for example, a sputtered film. Alternatively, each of the inner electrodes 3A and 3B may be formed by vapor deposition.

The thickness of each of the dielectric layers 4 in the stacking direction DS may be within the range from 0.5 μm to 1.5 μm. The main component of the material of the dielectric layer 4 may be, for example, an oxide ceramic material having a perovskite structure. The main component may be contained 50 at % or more. The ceramic material of the dielectric layer 4 may be, for example, barium titanate, strontium titanate, calcium titanate, magnesium titanate, strontium barium titanate, calcium barium titanate, calcium zirconate, barium zirconate, calcium zirconate titanate or titanium oxide. The dielectric layer 4 may be formed of, for example, a fired body of a coating film containing an oxide ceramic material.

The main component of the material of each of the lower cover layer 5A and the upper cover layer 5B may be, for example, a ceramic material. The main component (i.e., the ceramic material) of each of the lower cover layer 5A and the upper cover layer 5B may be the same as the main component (i.e., the ceramic material) of the dielectric layer 4.

Each of the external electrodes 6A and 6B has a base layer (underlayer) 7 formed on the element body 2 and a plating layer 9 formed on the base layer 7. The left base layer 7 is formed on the left side surface 2P of the element body 2 and extends over certain areas of the lower surface 2W and the upper surface 2T of the element body 2. The left base layer 7 may also extend over the front surface 2F and the rear surface 2R of the element body 2. The right base layer 7 is formed on the right side surface 2Q of the element body 2 and extends over certain areas of the lower surface 2W and the upper surface 2T of the element body 2. The right base layer 7 may also extend over the front surface 2F and the rear surface 2R of the element body 2. The left base layer 7 is entirely covered with the left plating layer 9, and the right base layer 7 is entirely covered with the right plating layer 9. The thickness of the lower face 6AW of the external electrode 6A is, for example, between 10 μm and 40 μm. The thickness of the lower face 6BW of the external electrode 6B is, for example, between 10 μm and 40 μm.

The main component of the metal used as the conductive material of the base layer 7 may contain at least one of, for example, Cu, Fe (iron), Zn (zinc), Al (aluminum), Ni, Pt, Pd, Ag, Au and Sn (tin) or may contain an alloy that includes at least one of these metals. The base layer 7 may include a co-material which is mixed with the metal(s) of the base layer. The co-material may be present in the form of a plurality of islands in the base layer 7. If the co-material is present in the base layer 7 in the form of the islands, the co-material can reduce the difference in the thermal expansion coefficient between the element body 2 and the base layer 7, and can alleviate the stress on the base layer 7. The co-material is, for example, the ceramic component, which is the main component of the dielectric layer 4. The base layer 7 may contain a glass component. If the glass component is mixed in the base layer 7, the glass component can densify the base layer 7. This glass component is, for example, an oxide of Ba (barium), Sr (strontium), Ca (calcium), Zn, Al, Si (silicon) or B (boron).

The base layer 7 may contain a metal component that is included in the element body 2. This metal component is, for example, Mg, and a trace amount of Ni, Cr, Sr, Al, Na and/or Fe may be included in this metal component. The base layer 7 may include, for example, a compound containing Mg, Ni and O as a compound of the metal used as the conductive material of the base layer 7, the metal contained in the element body 2 and oxygen.

The main component of the material of the plating layer 9 may be a metal such as Cu, Ni, Al, Zn or Sn, or an alloy made from two or more of these metals. The plating layer 9 may have a single-layer structure that includes a single metal component or a multi-layer structure that includes a plurality of plating layers of different metal components. For example, the plating layer 9 has a three-layer structure consisting of a Cu plating layer 9A formed on the base layer 7, a Ni plating layer 9B formed on the Cu plating layer 9A, and a Sn plating layer 9C formed on the Ni plating layer 9B.

The Cu plating layer 9A can enhance the adhesiveness of the plating layer 9 to the base layer 7. The Ni plating layer 9B can increase the thermal resistance of the external electrode 6A, 6B during soldering. The Sn plating layer 9C can improve the wettability of the solder to the plating layer 9. The left plating layer 9 is formed on the left base layer 7 such that the left plating layer 9 conducts with the internal electrode layers 3A via the left base layer 7. The right plating layer 9 is formed on the right base layer 7 such that the right plating layer 9 conducts with the internal electrode layers 3B via the right base layer 7. The two plating layers 9 also conduct to terminals of the mounting substrate through the solder, respectively.

For example, the size of the multilayer ceramic capacitor 1 may satisfy the relation of length>width>height, or the relation of length>width=height. The height of the multilayer ceramic capacitor 1 is the thickness of the multilayer ceramic capacitor 1 from the bottom surface 6AW of the external electrode 6A (6B) to a top surface 6AT of the external electrode 6A (6B).

The continuity rate of each of the internal electrode layers 3A, 3B in the length direction DL of the element body 2 is greater than the continuity rate of the internal electrode layer 3A, 3B in the width direction DW of the element body 2. Thus, even when the internal electrode layer 3A, 3B is fractured due to a difference in materials between the internal electrode layer 3A, 3B and the dielectric layer 4, it is possible to suppress an increase in ESR in the direction from the internal electrode layer 3A to the external electrode 6A and in the direction from the internal electrode layer 3B to the external electrode 6B.

If the inner electrode layers 3A and 3B are formed by sputtering, it is possible to make the inner electrode layers 3A and 3B thin. Therefore, it is possible to increase the number of the inner electrode layers 3A and 3B. This enhances the capacitance of the multilayer ceramic capacitor 1, and reduces the height of the multilayer ceramic capacitor 1.

Figure 2A:
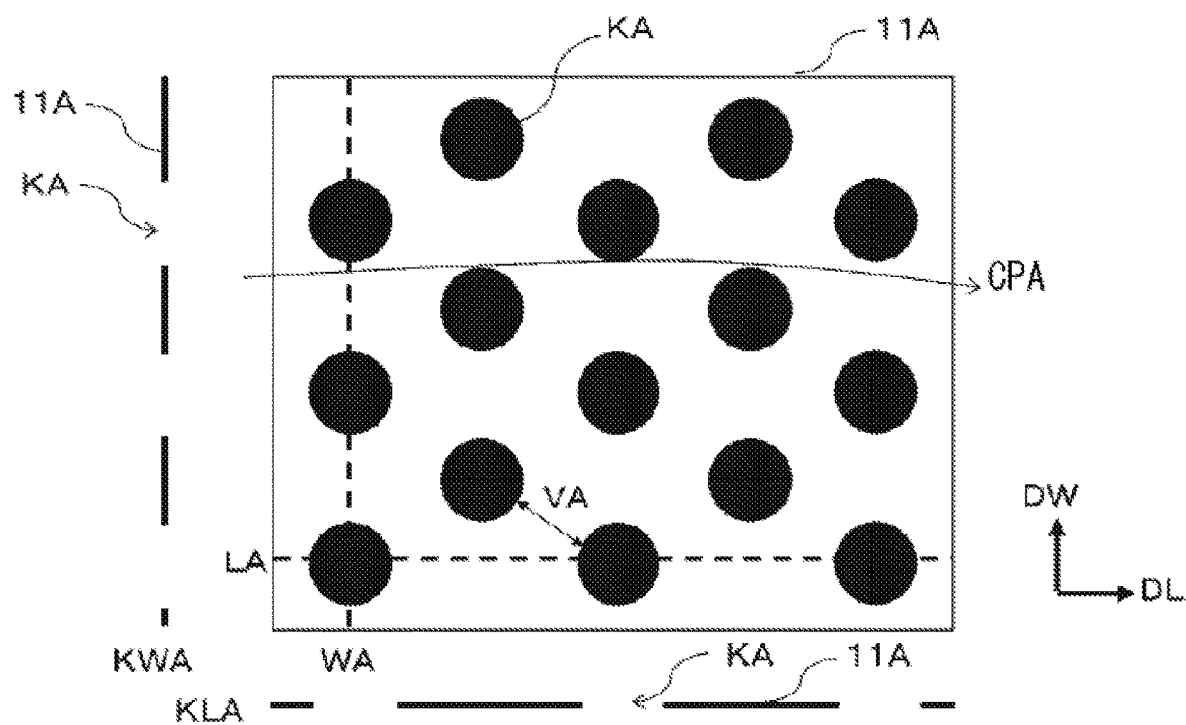
FIG. 2A is a plan view showing an example of a current path when the continuity rate of the inner electrode in the length direction is larger than in the width direction.
Figure 2B:
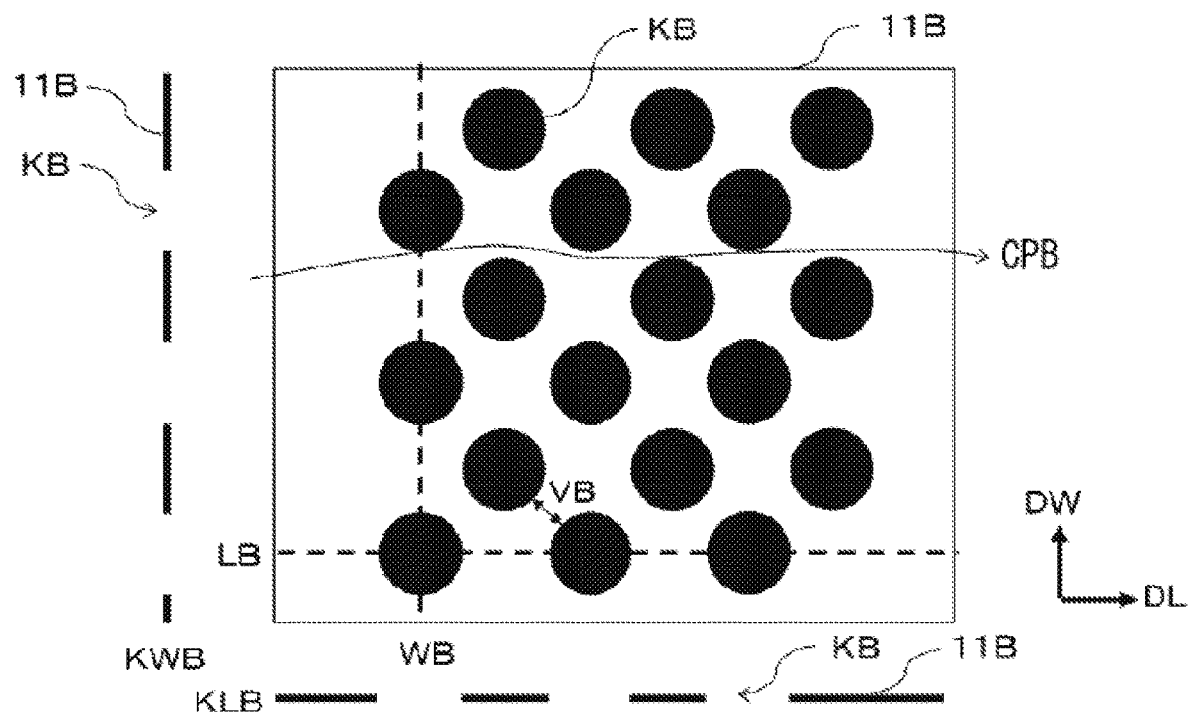
FIG. 2B is a plan view showing an example of a current path when the continuity rate in the length direction of the inner electrode is equal to the continuity rate in the width direction.

FIG. 2A is a plan view showing an example of a current path CPA when the continuity rate KLA of the inner electrode in the length direction DL is larger than the continuity rate KWA of the inner electrode in the width direction DW. FIG. 2B is a plan view showing an example of a current path CPB when the continuity rate KLB of the inner electrode in the length direction DL is equal to the continuity rate KLB of the inner electrode in the width direction DW. FIG. 2C is a plan view illustrating an exemplary current path CPC when the continuity rate KLC of the inner electrode in the length DL is smaller than the continuity rate KLC of the inner electrode in the width direction DW.

FIG. 2A shows the continuity rate KLA of the inner electrode layer 11A, which is obtained when the inner electrode layer 11A is cut along a cutting line LA, and also shows the continuity rate KWA, which is obtained when the inner electrode layer 11A is cut along a cutting line WA. FIG. 2B shows the continuity rate KLB of the inner electrode layer 11B when the inner electrode layer 11B is cut along a cutting line LB and the continuity rate KWB of the inner electrode layer 11B when the inner electrode layer 11B is cut along a cutting line WB. FIG. 2C shows the continuity rate KLC of the inner electrode layer 11C when the inner electrode layer 11C is cut along a cutting line LC, and the continuity rate KWC of the inner electrode layer 11C when the inner electrode layer 11C is cut along a cutting line WC.

In FIG. 2A, each of black circles KA represent a gap formed in the inner electrode layer 11A. It is assumed that the continuity rate KLA of the inner electrode layer 11A in the length direction DL of the multilayer ceramic capacitor 1 is larger than the continuity rate KWA of the inner electrode layer 11A in the width direction DW of the multilayer ceramic capacitor 1. In this configuration, the current path CPA of the inner electrode layer 11A is shorter in the length direction DL than in the width direction DW. A volume of a region VA between the gaps KA and KA in FIG. 2A is larger than a volume of a region VB between the gaps KB and KB in FIG. 2B. A resistance of the region VA between the gaps KA and KA is smaller than the resistance of the region VB between the gaps KB and KB.

In FIG. 2B, black circles KB represents gaps formed in the inner electrode layer 11B, respectively. The continuity rate KLB of the inner electrode layer 11B in the length direction DL of the multilayer ceramic capacitor 1 is equal to the continuity rate KWB of the inner electrode layer 11B in the width direction DW of the multilayer ceramic capacitor 1. In this configuration, the current path CPB of the inner electrode layer 11B is equal between in the length direction DL and in the width direction DW.

In FIG. 2C, black circles KC represents gaps formed in the inner electrode layer 11C, respectively. The continuity rate KLC of the inner electrode layer 11C in the length direction DL of the multilayer ceramic capacitor 1 is smaller than the continuity rate KWC of the inner electrode layer 11C in the width direction DW of the multilayer ceramic capacitor. In this configuration, the current path CPC of the inner electrode layer 11C is shorter in the width direction DW than in the length direction DL. The volume of a region VC between the gaps KC and KC in FIG. 2C is smaller than the volume of the region VB in FIG. 2B. The resistance of the region VC larger than the resistance of the region VB.

Figure 3A:
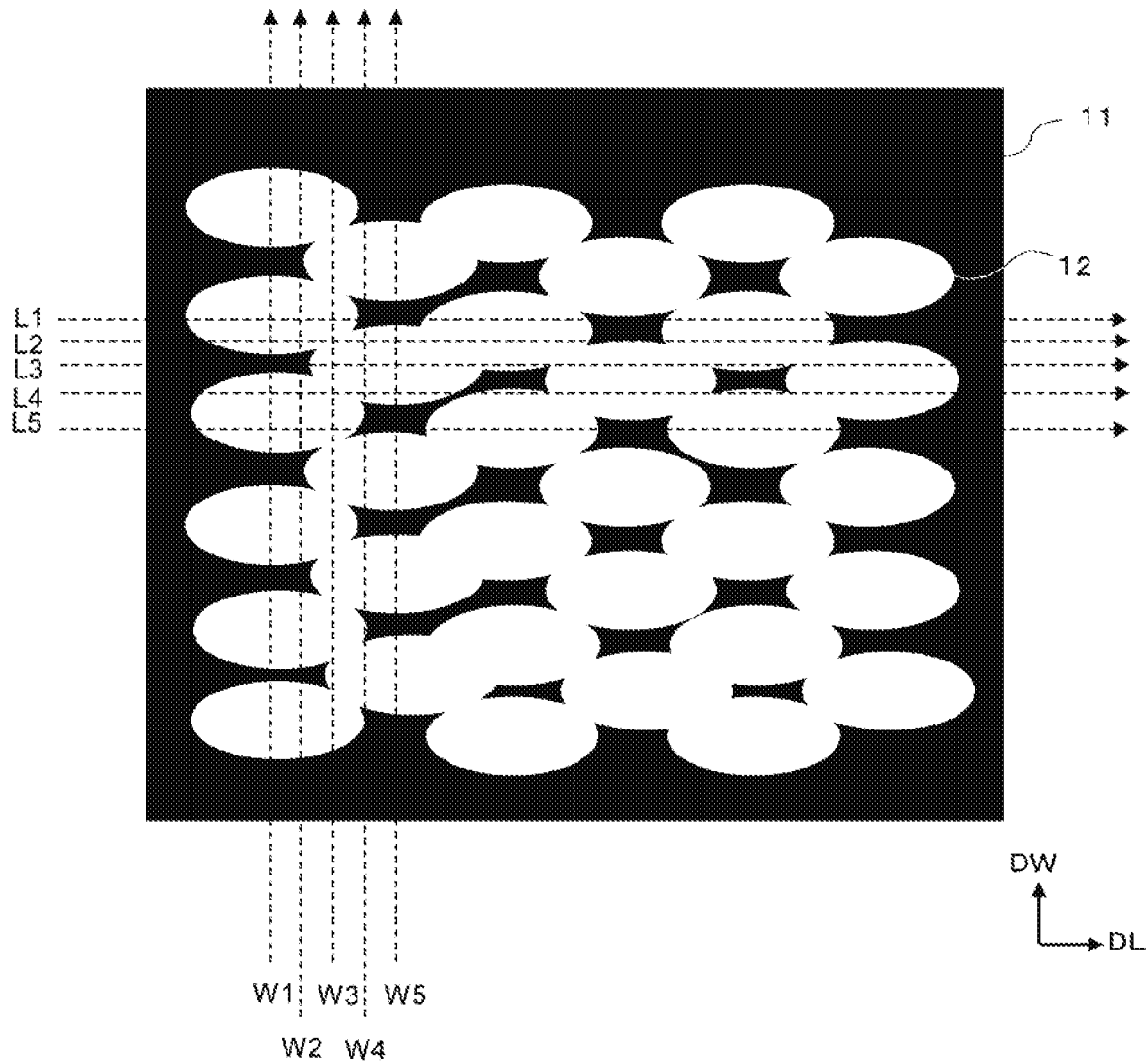
FIG. 3A is a plan view useful to describe different cutting positions at the time of calculation of the continuity rate of the inner electrode.
Figure 3B:
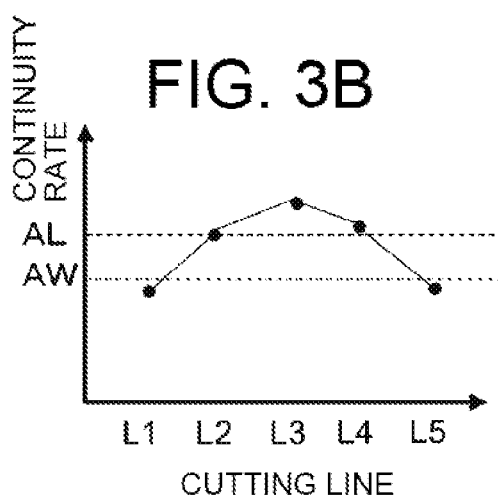
FIG. 3B shows an example of a relationship between the cutting position and the continuity rate of the inner electrode in a length direction of an element body.
Figure 3C:
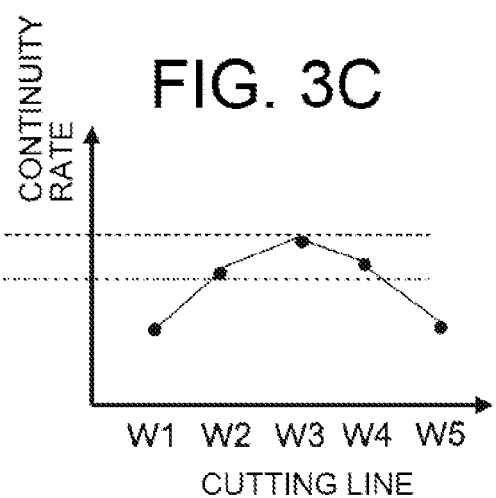
FIG. 3C shows an example of a relationship between the cutting position and the continuity rate of the inner electrode in a width direction of the element body.

When the ESR of the inner electrode layer 11A in the length direction DL of the multilayer ceramic capacitor 1 is represented by RA, the ESR of the inner electrode layer 11B in the length direction DL of the multilayer ceramic capacitor 1 is represented by RB, and the ESR of the inner electrode layer 11C in the length direction DL of the multilayer ceramic capacitor 1 is represented by RC, a relationship of RA<RB<RC is obtained. Therefore, if the continuity rate KLA of the inner electrode layer 11A in the length direction DL of the multilayer ceramic capacitor is greater than the continuity rate KWA of the inner electrode layer 11A in the width direction DW of the multilayer ceramic capacitor, it is possible to suppress an increase in the ESR of the inner electrode layer 11A in the length direction DL of the multilayer ceramic capacitor 1 even when the inner electrode layer 11A is broken, FIG. 3A is a plan view showing an example of changing the cutting position at the time of calculation of the continuity rate of the inner electrode. FIG. 3B shows an example of the relationship between the cutting position and the continuity rate of the inner electrode in the length direction DL. FIG. 3C shows an example of the relationship between the cutting position and the continuity rate of the inner electrode in the width direction DW.

In FIG. 3A, in order to obtain a plurality of continuity rates of the inner electrode layer 12 in the length direction DL and the width direction DW, the inner electrode layer 12 is cut along the lines L1-L5 in the length direction DL and along the lines W1-W5 in the width direction DW. Even if the cutting direction of the inner electrode layer 12 is the same (e.g., the cutting direction is DL), the continuity rate changes with the cutting line (L1-L5).

As shown in FIG. 3A, the inner electrode layer 12 is cut along the five cutting lines (cutting positions) L1 to L5 in the length direction DL to obtain five continuity rates in the length direction DL of the inner electrode layer 12. The results are shown in FIG. 3B. The continuity rate in the length direction DL of the inner electrode layer 12 changes as shown in FIG. 3B. Similarly, the inner electrode layer 12 is cut along the five cutting lines (cutting positions) W1 to W5 in the width direction DW to obtain five continuity rates in the width direction DW of the inner electrode layer 12. The results are shown in FIG. 3C. The continuity rate in the width direction DW of the inner electrode layer 12 changes as shown in FIG. 3C.

Depending on the cutting position of the inner electrode layer 12, the continuity rate of the inner electrode layer 12 in the length direction DL of the multilayer ceramic capacitor is smaller than the continuity rate of the inner electrode layer 12 in the width direction DW of the multilayer ceramic capacitor. In order to suppress variation in the continuity rate when cutting in the same direction, the continuity rate may be an average value of the continuity rates in the same direction at different cutting positions in the same plane. For example, the continuity rate of the inner electrode layer 12 in the length direction DL may be an average value AL of the five continuity rates at the five cutting positions L1-L5, as shown in FIG. 3B, and the continuity rate of the inner electrode layer 12 in the width direction DW may be an average value AW of the five continuity rates at the five cutting positions W1-W5, as shown in FIG. 3C.

Figure 4:
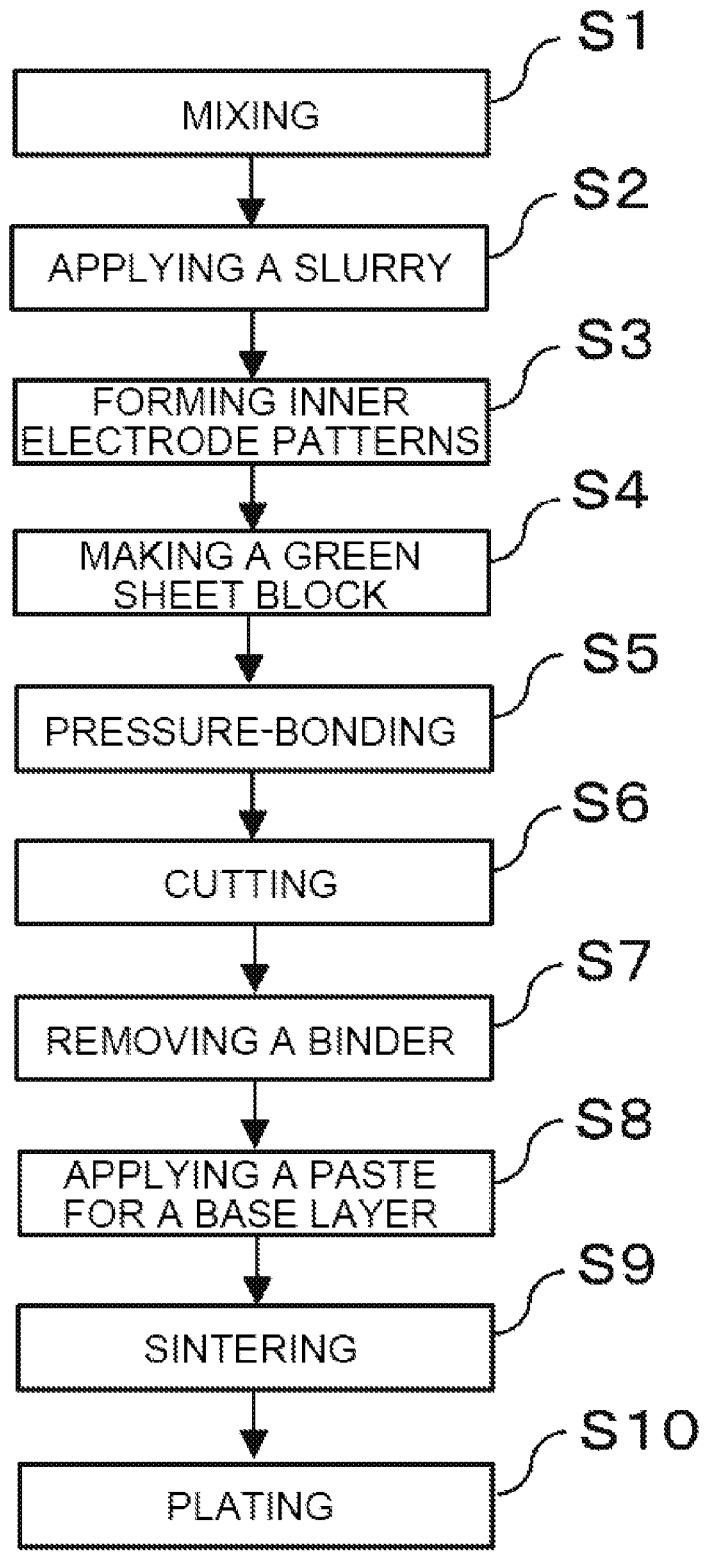
FIG. 4 is a flowchart showing a method of manufacturing the multilayer ceramic capacitor according to the first embodiment.

FIG. 4 is a flowchart showing a method of manufacturing the multilayer ceramic capacitor 1 according to the first embodiment. FIG. 5A to FIG. 5H are a series of cross-sectional views showing the method of manufacturing the multilayer ceramic capacitor 1. It should be noted that only two inner electrode layers 3A and two inner electrode layers 3B are alternately stacked via the dielectric layers 4 in FIG. 5C-FIG. 5H although the capacitor 1 of FIG. 1 has more than two layers 3A and more than two layers 3B.

In Step S1 of FIG. 4, an organic binder and an organic solvent as a dispersant and a forming aid are added to a dielectric material powder, and pulverized and mixed to produce a muddy slurry. The dielectric material powder includes, for example, a ceramic powder. The dielectric material powder may contain an additive or additives. The additive(s) may be, for example, an oxide of Mg, Mn, V, Cr, Y, Sm, Eu, Gd, Tb, Dy, Ho, Er, Tm, Yb, Co, Ni, Li, B, Na, K or Si, or glass. The organic binder is, for example, polyvinyl butyral resin or polyvinyl acetal resin. The organic solvent is, for example, ethanol or toluene.

Figure 5A:
FIG. 5A is a cross-sectional view useful to describe the manufacturing method for the multilayer ceramic capacitor according to the first embodiment.

Next, as indicated in Step S2 of FIG. 4 and shown in FIG. 5A, a green sheet 24 is prepared. Specifically, the slurry containing the ceramic powder 22 is applied onto a carrier film 21 in a sheet form and dried to manufacture the green sheet 24. The carrier film is, for example, a PET (polyethylene terephthalate) film. A doctor blade method, a die coater method or a gravure coater method may be used to apply the slurry 22 onto the carrier film 21. Step S2 is repeated to prepare a plurality of green sheets 24.

Figure 5B:
FIG. 5B is another cross-sectional view useful to describe the manufacturing method for the multilayer ceramic capacitor according to the first embodiment.

Next, as indicated in Step S3 of FIG. 4 and shown in FIG. 5B, a plurality of internal electrode patterns 23 are formed on each of those green sheets 24, which will become the internal electrode layers 3A and 3B of FIG. 1, among the green sheets prepared in Step 51. The internal electrode pattern 23 may be formed by sputtering. In Step S3, it is possible to form a plurality of internal electrode patterns 23 on each green sheet 24 such that the internal electrode patterns 23 are separated from each other in the longitudinal direction of the green sheet 24. To form the inner electrode patterns 23 on the green sheet 24 by sputtering, an electrode material is forced to adhere on the green sheet 24 through a metal mask that has a plurality of openings corresponding to the internal electrode patterns 23. The inner electrode pattern 23 may be composed of a single metal or alloy. The internal electrode pattern 23 does not include a ceramic component. The internal electrode patterns 23 may be formed by a vacuum deposition method, ion plating, or the like, instead of sputtering.

Figure 5C:
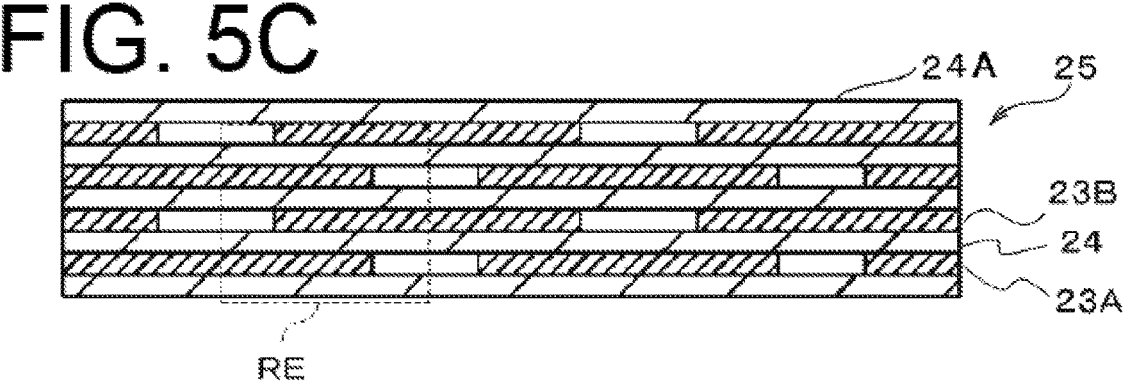
FIG. 5C is still another cross-sectional view useful to describe the manufacturing method for the multilayer ceramic capacitor according to the first embodiment.

Next, as indicated in Step S4 in FIG. 4 and shown in FIG. 5C, a block 25 of green sheets 24 is formed. Specifically, the green sheets 24 on which the inner electrode patterns 23 are formed, and the green sheet 24A on which the inner electrode pattern 23 is not formed are stacked in a predetermined order to make the green sheet block or laminate 25. The green sheets 24 having the internal electrode patterns 23 thereon are divided into two groups, i.e., the green sheets 24 having the internal electrode patterns 23A thereon and the green sheets 24 having the internal electrode patterns 23B thereon. Then, the green sheets 24 having the internal electrode patterns 23A thereon and the green sheets 24 having the internal electrode patterns 23B thereon are stacked alternately in the laminating direction such that the internal electrode patterns 23A on the green sheet 24 and the internal electrode patterns 23B on the next or adjacent green sheet 24 are alternately shifted in the longitudinal direction of the green sheet 24. Further, three types of portions are defined in the green sheet block 25. Specifically, a portion where only the internal electrode patterns 23A are stacked in the stacking direction, a portion where the internal electrode patterns 23A and 23B are stacked alternately in the stacking direction, and a portion where only the internal electrode patterns 23B are stacked in the stacking direction are defined in the green sheet block 25. On the other hand, when the green sheet block 25 is viewed in the lateral direction of the green sheet 24, the ends of the inner electrode patterns 23A and 23B of the green sheet 24 are aligned with each other in the stacking direction of the green sheets 24. In the lateral direction of the green sheet block 25, two types of portions are defined, i.e., a portion where the inner electrode patterns 23A and 23B are stacked alternately in the stacking direction via the green sheets 24, and another portion where only the green sheet s24 are stacked.

Figure 6A:
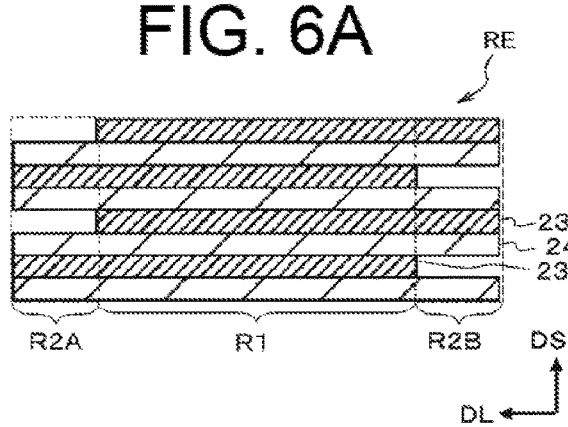
FIG. 6A is a cross-sectional view showing a configuration example of one element body region in the green sheet block shown in FIG. 5C in the length direction prior to hydrostatic pressing.
Figure 6C:
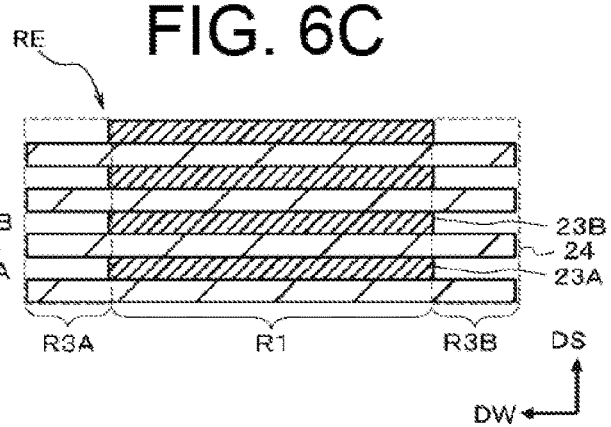
FIG. 6C is a cross-sectional view showing a configuration example of one element body region in the green sheet block shown in FIG. 5C in the width direction prior to hydrostatic pressing.
Figure 7A:
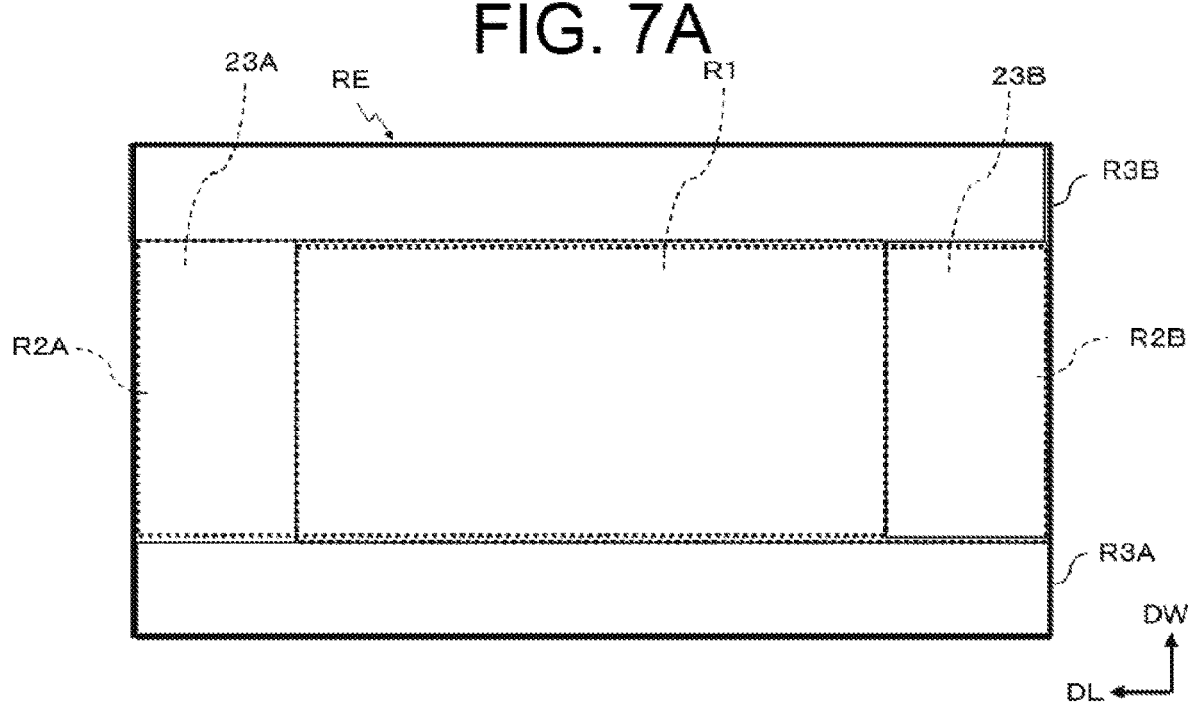
FIG. 7A is a plan view illustrating a positional relation among a charge accumulating portion, electrode lead-out portions and lateral margins in the element body region.
Figure 7B:
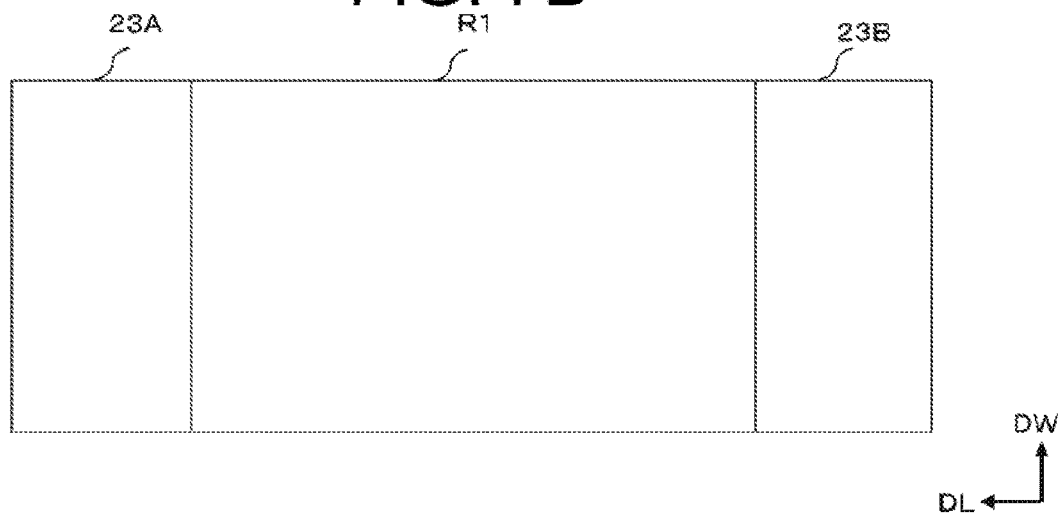
FIG. 7B is a plan view showing an inner electrode pattern in the charge accumulating portion and the electrode lead-out portions of FIG. 7A prior to hydrostatic pressing.

FIG. 6A is a cross-sectional view of an element body region RE of the green sheet block 25 taken along the length direction of the green sheet block 25, showing a configuration example of the element body region RE prior to applying hydrostatic pressing to the green sheet block 25 (FIG. 5C). FIG. 6C is a cross-sectional view of the element body region RE taken along the width direction of the green sheet block 25. FIG. 7A is a plan view showing the positional relationships among a charge-accumulating portion R1, electrode-extracting portions R2A and R2B, and side margins R3A and R3B of the element body region RE. FIG. 7B is a plan view showing the charge-accumulating portion R1 and the inner electrode patterns 23A and 23B of the electrode-extracting portions shown in FIG. 7A prior to applying the hydrostatic pressing to the green sheet block.

In FIG. 6A, FIG. 6C, FIG. 7A, and FIG. 7B, one element body area RE of the laminate 25 includes the charge-accumulating portion R1, the electrode-extracting portions R2A and R2B, and the side margin portions R3A and R3B. As shown in FIG. 6A, the charge-accumulating portion R1 is a portion where the inner electrode patterns 23A and 23B are stacked alternately in the stacking direction via the green sheets 24. In the multilayer ceramic capacitor 1, charges are accumulated in the charge storage portion RE As shown in FIG. 6A, the electrode lead-out portion R2A is a portion where the inner electrode patterns 23A and the green sheets 24 extend to the left from the charge storage portion R1 in the longitudinal direction DL of the element body region RE. The electrode lead-out portion R2B is a portion where the inner electrode patterns 23B and the green sheets 24 extend to the right from the charge storage portion R1 in the longitudinal direction DL of the element body region RE. As illustrated in FIG. 6C, the side margin portions R3A and R3B are portions where only the green sheets 24 are stacked. It can be said that the green sheets 24 and vacant layers are alternately stacked in each of the side margin portions R3A and R3B.

If the sum of the stacked internal electrode patterns 23A and 23B is represented by N (N=4 in FIG. 6A), and the electrode thickness of the internal electrode pattern 23A, 23B is represented by T, then the sum Si of the electrode thickness of the internal electrode patterns 23A and 23B in the charge accumulating portion R1 is given by a following equation: S1=N×T. In FIG. 6A, S1=4×T. The electrode lead-out portion R2A, the sum S2 of the electrode thickness of the internal electrode patterns 23A and 23B in the electrode lead-out portion R2A, R2B is given by a following equation; S2=N×T/2. In FIG. 6A, S2=2×T. The sum S3 of the electrode thickness of the internal electrode patterns 23A and 23B in the side margin portion R3A, R3B is given by a following equation: S3=0.

Figure 5D:
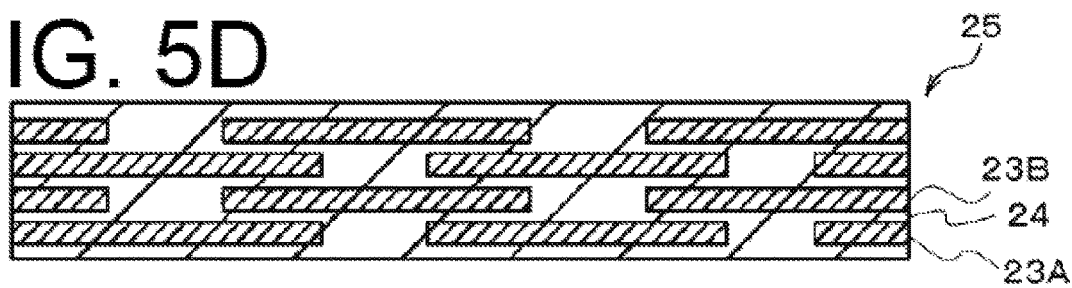
FIG. 5D is yet another cross-sectional view useful to describe the manufacturing method for the multilayer ceramic capacitor according to the first embodiment.

Next, as indicated in Step S5 of FIG. 4 and shown in FIG. 5D, the green sheet block 25 obtained in the forming process of Step S4 is pressed to bond the green sheets 24. A method of pressing the green sheet block 25 includes, for example, a step of sandwiching the green sheet block 25 between resin films and a step of applying opposite pressing forces to the resin films with hydrostatic pressure. The green sheet block 25 may be pressed in the stacking direction such that the elongation ratio of the green sheet block 25 in the length direction DL is different from the elongation ratio in the width direction DW, i.e., the elongation ratio of the green sheet block 25 has anisotropy in the horizontal plane.

Figure 6B:
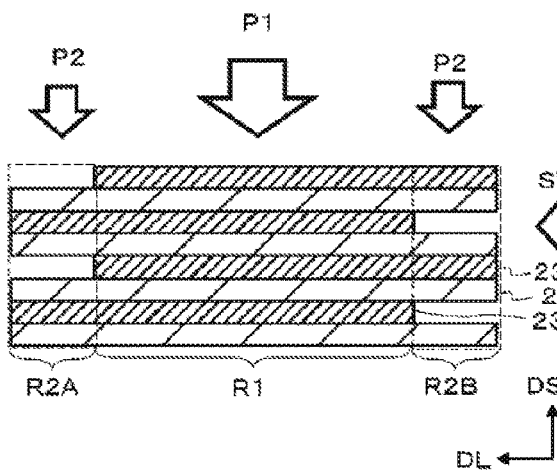
FIG. 6B is similar to FIG. 6A and shows a pressure distribution applied to the element body region by hydrostatic pressing.
Figure 6D:
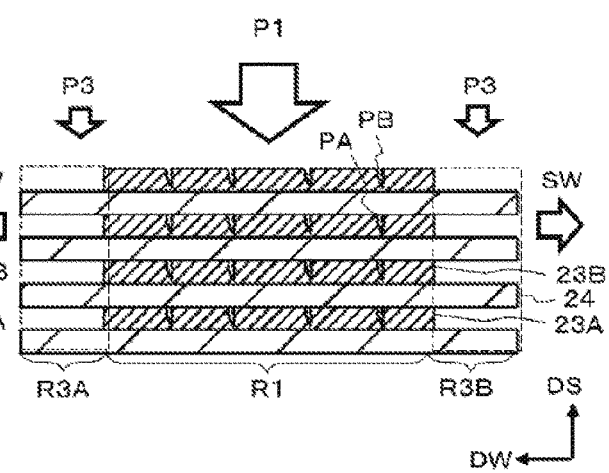
FIG. 6D is similar to FIG. 6C and shows a pressure distribution applied to the element body region by hydrostatic pressing.

FIG. 6B corresponds to FIG. 6A, and FIG. 6D corresponds to FIG. 6C. Each of FIG. 6B and FIG. 6D is a cross-sectional view showing a pressure distribution applied to the element body region RE of the laminate 25 by hydrostatic pressing. FIG. 7C is a plan view showing the inner electrode patterns in the charge accumulating portion R1 and the electrode extraction portions after applying the hydrostatic pressing to the green sheet block.

Referring to FIG. 6B and FIG. 6D, the total electrode thicknesses S1, S2 and S3 are different from each other in the element body region RE. Thus, the pressure distribution is generated in the green sheet block 25 when the green sheet block 25 is hydrostatically pressed. If the pressure generated at the charge accumulation portion R1 is represented by P1, the pressure generated at each of the electrode lead-out portions R2A and R2B is represented by P2, and the pressure generated at each of the side margin portions R3A and R3B is represented by P3, a relationship of P1>P2>P3 is established because S1>S2>S3.

As shown in FIG. 6D and FIG. 7C, there is a large difference between the total electrode thickness S1 of the charge-accumulating portion R1 and the total electrode thickness S3 of the side margin R3A, R3B, and therefore the pressure difference at the time of hydrostatic pressure pressing becomes large, i.e., the difference between the pressure P1 and the pressure P3 is greater than the difference between the pressure P1 and the pressure P2. Consequently, as the charge accumulating portion R1 is compressed in the thickness direction DS of the green sheet block 25, the elongation force SW acts in the width direction DW of the green sheet 24, as shown in FIG. 6D.

Assuming that each of the green sheets 24 is formed of a coating film, the green sheet 24 includes a binder together with the dielectric material powder. Therefore, the green sheet 24 has fluidity and can elongate in accordance with the elongation force SW exerted on the green sheet 24. On the other hand, assuming that each of the inner electrode patterns 23A and 23B is made by sputtering, the inner electrode pattern 23A, 23B includes only a metal. Therefore, the internal electrode pattern 23A, 23B has little fluidity. When the elongation force SW acts on the internal electrode pattern 23A, 23B, the internal electrode pattern 23A, 23B is ruptured. A larger elongation force SW acts on the inner electrode pattern 23A, 23B in the width direction DW than in the length direction DL. Thus, as shown in FIG. 7C, fractured portions PA and PB are formed in the inner electrode patterns 23A and 23B such that the respective fractured portion PA, PB has a greater component in the length direction DL than in the width direction DW.

Figure 5E:
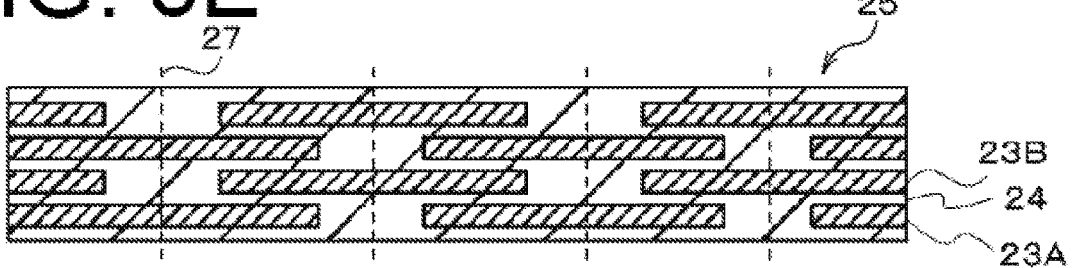
FIG. 5E is another cross-sectional view useful to describe the manufacturing method for the multilayer ceramic capacitor according to the first embodiment.
Figure 5F:
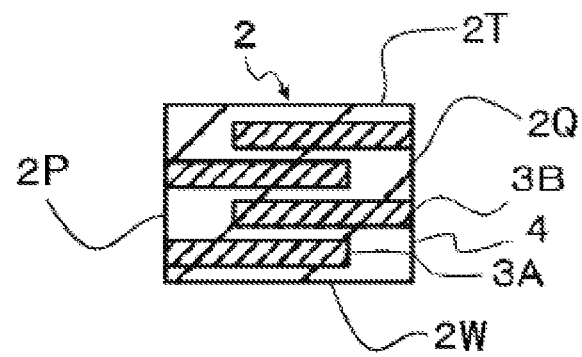
FIG. 5F is another cross-sectional view useful to describe the manufacturing method for the multilayer ceramic capacitor according to the first embodiment.

Next, as indicated in Step S6 of FIG. 4 and shown in FIG. 5E, the pressed laminate block 25 is cut such that the block 25 is separated to a plurality of element bodies, each of which has a rectangular parallelepiped shape. Each element body has six surfaces. The cutting of the laminate block 25 is carried out at the portions where only the inner electrode patterns 23A are present in the stacking direction, and the portions where only the inner electrode patterns 23B are present in the stacking direction, as indicated by a plurality of vertical broken lines 27. The cutting of the laminate block 25 is carried out by, for example, blade dicing or a similar method. One of the resulting element bodies 2 is shown in FIG. 5F. The inner electrode patterns 23A and 24B become the inner electrode layers 3A and 3B, respectively, in each of the resulting element bodies 2. In this manner, the green sheet block 25 is divided into a plurality of sub-blocks (element bodies) 2.

As shown in FIG. 5F, the individual element body 2 has the inner electrode layers 3A and 3B which are alternately laminated via the dielectric layers 4. The inner electrode layers 3A are exposed at the left surface 2P of the element body 2, and the inner electrode layers 3B are exposed at the right surface 2Q of the element body 2.

Next, as indicated in Step S7 of FIG. 4, the binder contained in the element body 2 shown in FIG. 5F is removed. The process of removing the binder may be carried out by, for example, heating the element body 2 in an $N_2$ atmosphere at about 350 degrees C.

Next, as indicated in Step S8 of FIG. 4, the conductive paste for the underlayer 7 is applied to the side surfaces 2P and 2Q of the element body 2 and the end areas of the remaining four surfaces (upper surface 2T, lower surface 2W, front surface 2F and rear surface 2R) of the element body 2. Then, the conductive paste is dried. The conductive paste for the underlayer 7 may be applied the surfaces of the element body 2 by, for example, a dip method. The conductive paste for the base layer 7 includes a powder or filler of the metal used as the conductive material of the base layer 7. For example, when the metal used as the conductive material of the base layer 7 is Ni, the conductive paste for the base layer includes a powder or filler of Ni. Further, the conductive paste for the base layer includes, as a co-material, a ceramic component, which is the main component of the dielectric layers 4, for example. Particles of oxide ceramics mainly composed of barium titanate (0.8 μm to 4 μm in D50 particle diameter), for example, are mixed in the conductive paste for the base layer, as the co-material. Further, the conductive paste for the base layer includes a binder and a solvent.

Figure 5G:
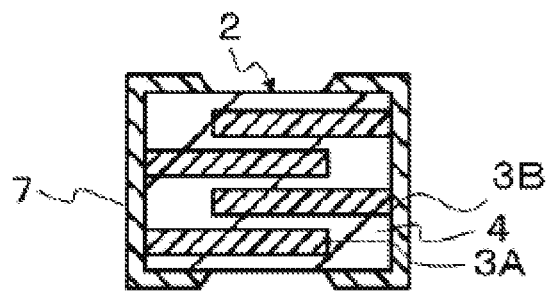
FIG. 5G is another cross-sectional view useful to describe the manufacturing method for the multilayer ceramic capacitor according to the first embodiment.

Next, as indicated in Step S9 of FIG. 4 and shown in FIG. 5G, the element bodies 2, on which the conductive paste for the base layer is applied in Step S8 of FIG. 4, undergo the sintering process such that the inner electrode layers 3A and 3B are integrated with the dielectric layers 4 in each element body 2 and the base layers 7 are formed and integrated with the element body 2. The sintering of the element bodies 2 and the conductive paste for the base layers is carried out in, for example, a sintering furnace in a temperature range from 1000 degrees C. to 1400 degrees C. for ten minutes to two hours. If a base metal such as Ni or Cu is used as the material of the interna electrode layers 3A and 3B, the sintering process may be carried out in the sintering furnace while the interior of the sintering furnace is kept to a reducing atmosphere in order to prevent the oxidation of the internal electrode layers 3A and 3B.

Figure 5H:
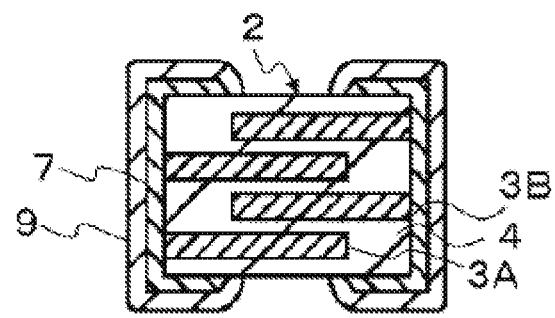
FIG. 5H is another cross-sectional view useful to describe the manufacturing method for the multilayer ceramic capacitor according to the first embodiment.

Next, as indicated in Step S10 of FIG. 4 and shown in FIG. 5H, a plating layer 9 is formed on each of the base layers 7. In the process of forming the plating layer 9, for example, Cu plating, Ni plating and Sn plating may be sequentially performed. In this process, the element body 2 on which the base layers 7 are formed is placed in a barrel together with the plating solution, and the electricity is supplied to the barrel while rotating the barrel, so as to form the plating layers 9.

Because each of the fracture portions PA and PB in the inner electrode patterns 23A and 23B has a greater component in the length direction DL than in the width direction DW, each of the inner electrode layers 3A and 3B in the element body 2 has a greater continuity rate in the length direction DL than in width direction DW. Therefore, even when the inner electrode layers 3A and 3B are broken due to a difference in material between the inner electrode layer 3A, 3B and the dielectric layer 4, it is possible to suppress an increase in ESR in a direction toward the outer electrode 6A from the inner electrode layers 3A and toward the outer electrode 6B from the inner electrode layers 3B.

The respective inner electrode pattern 23A and 23B has a greater total electrode thickness in the electrode lead-out portion R2A, R2B than in the side margin portions R3A and R3B. Therefore, when pressing the green sheet block 25 by a hydrostatic pressing machine, it is possible to apply a larger elongation force SW on the inner electrode patterns 23A and 23B in the width direction DW than in the length direction DL. Accordingly, while suppressing an increase in the number of processing steps, it is possible to form the fracture portions PA and PB in the internal electrode patterns 23A and 23B such that the component of the fracture portion in the longitudinal direction DL is larger than the component of the fracture portion in the width direction DW. Thus, the continuity rate of each of the internal electrode layers 3A and 3B in the longitudinal direction DL of the element body 2 can be greater than the continuity rate of each of the internal electrode layers 3A and 3B in the width direction DW of the element body 2.

Because the sputtering is used to form the inner electrode patterns 23 on each of the green sheets 24, it is possible to form the thin inner electrode layer 3A, 3B. Therefore, while reducing the height of the multilayer ceramic capacitor 1, it is possible to secure the strength or rigidity of the multilayer ceramic capacitor 1 during the process of mounting the multilayer ceramic capacitor 1 onto a mounting board. It is also possible to increase the number of inner electrode layers 3A and 3B stacked in the height direction DS of the multilayer ceramic capacitor 1. This increases the capacitance of the multilayer ceramic capacitor 1.

Second Embodiment

Figure 8:
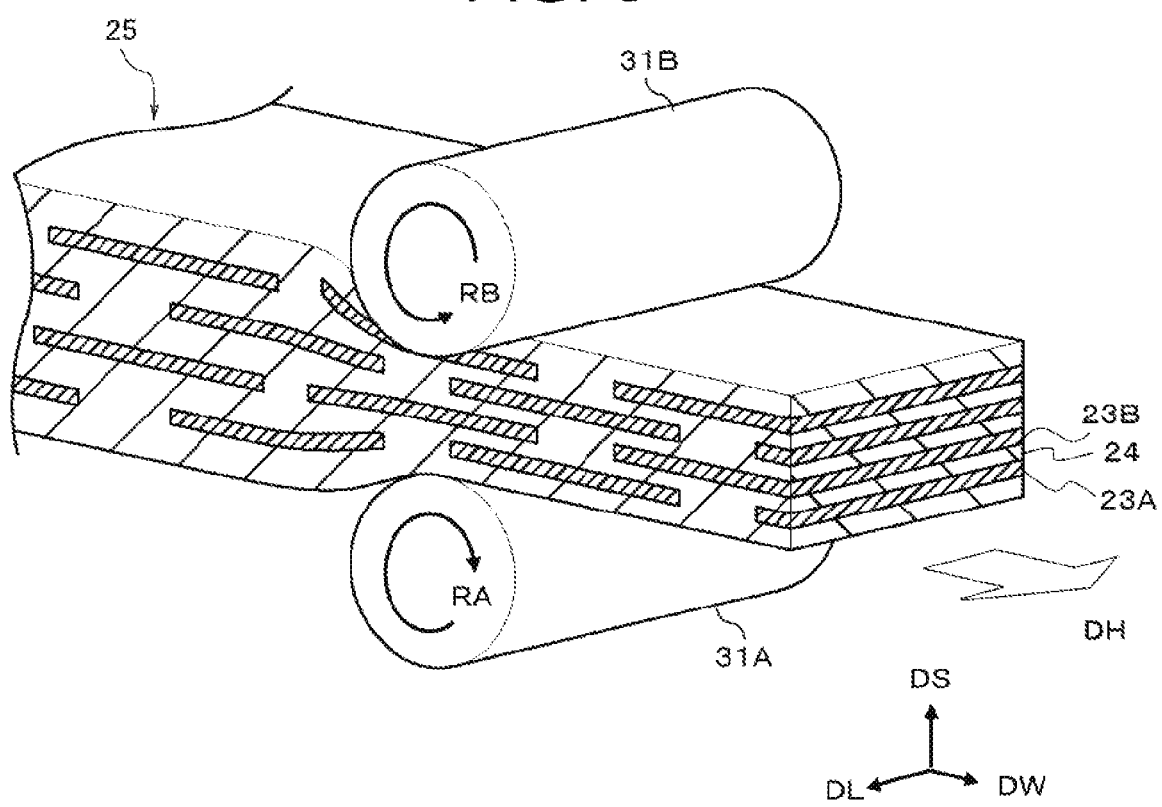
FIG. 8 is a perspective view showing another method of compressing the green sheet block according to a second embodiment of the present invention.

FIG. 8 is a perspective view showing a method of compressing the green sheet block 25 according to a second embodiment of the present invention. Although a hydrostatic press machine is used to compress the green sheet block 25 of FIG. 5C in the first embodiment, a rolling machine is used to compress the green sheet block 25 of FIG. 5C in the second embodiment.

As shown in FIG. 8, the rolling machine includes a pair of parallel rollers 31A and 31B. The two rollers 31A and 31B face each other at a predetermined gap. Th spacing between the two rollers 31A and 31B (i.e., the distance of the outer surface of the lower roller 31A and the outer surface of the upper roller 31B) is smaller than the thickness of the green sheet block 25 shown in FIG. 5C.

The rotation direction RA of the roller 31A and the rotation direction RB of the roller 31B are set such that the green sheet block 25 of FIG. 5C is conveyed in a conveyance direction DH. The conveying direction DH of the green sheet block 25 may be the same as the length direction DL of the element body 2. The green sheet block 25 of FIG. 5C is rolled between the rollers 31A and 31B while conveyed in the conveyance direction DH such that the green sheet block 25 is pressed in the height direction DS of the green sheet block 25. Thus, the element body 2 undergoes the rolling process. During the rolling process, the inner electrode patterns 23A and 23B experience a larger elongation (receive a large elongation force) in the width direction DW than in the length direction LD. Therefore, it is possible for the inner electrode pattern 23A, 23B to have fracture portions whose components in the longitudinal direction DL are larger than the components in the width direction DW.

Examples

The inventor made a multilayer ceramic capacitor 1 of FIG. 1A that had more than 100 inner electrode layers 3A and 3B stacked in the height direction DS, and conducted an experiment to confirm that the continuity rate of the inner electrode layers 3A and 3B. The thickness of each of the inner electrode layers 3A and 3B was between 0.3 μm and 0.5 μm, and the thickness of each of the dielectric electrode layers 4 was between 0.8 μm and 1.5 μm. The experiment results indicated that the continuity rate of the inner electrode layer 3A, 3B in the length direction DL was 64.8% and the continuity rate of the inner electrode layers 3A, 3B in the width direction DW was 58.2%. The ratio of the latter continuity rate to the former continuity rate was 0.898.

It will be apparent to those skilled in the art that various modifications and variations can be made in the present invention without departing from the spirit or scope of the invention. Thus, it is intended that the present invention encompasses modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multilayer ceramic capacitor comprising:
   an element body that includes at least one first internal electrode layer, at least one second internal electrode layer, and at least one dielectric layer situated between the at least one first internal electrode layer and the at least one second internal electrode layer, the element body having a plurality of surfaces, the plurality of surfaces including a first surface and a second surface opposite the first surface;
   a first external electrode formed on the first surface of the element body and connected to the at least one first internal electrode layer; and,
   a second external electrode formed on the second surface of the element body and connected to the at least one second internal electrode layer,
   wherein each of the at least one first internal electrode layer has a first end exposed in the first surface and has a first current path extending in a first plane perpendicular to the first surface such that the first current path has a shorter component per unit length on the first plane in a first direction toward the first surface than in a second direction perpendicular to the first direction, and
   wherein each of the at least one second internal electrode layer has a second end exposed in the second surface and has a second current path extending in a second plane perpendicular to the second surface such that the second current path has a shorter component per unit length on the second plane in a third direction toward the second surface than in a fourth direction perpendicular to the third direction.

2. The multilayer ceramic capacitor according to claim 1, wherein the at least one first internal electrode layer includes at least one first fractured portion that factures toward the first surface, and the at least one second internal electrode layer includes at least one second fractured portion that fractures toward the second surface.

3. The multilayer ceramic capacitor according to claim 1, wherein the number of gaps formed in each of the at least one first internal electrode layer in a first region having a predetermined size in the first direction on the first plane is less than the number of gaps formed in the first internal electrode layer in a second region having the predetermined size in the second direction on the first plane, and
   wherein the number of gaps formed in each of the at least one second internal electrode layer in a third region having the predetermined size in the third direction on the second plane is less than the number of gaps formed in the second internal electrode layer in a fourth region having the predetermined size in the fourth direction on the second plane.

4. The multilayer ceramic capacitor according to claim 1, wherein each of the at least one first internal electrode layer contains no ceramic component, and each of the at least one second internal electrode layer contains no ceramic component.

5. The multilayer ceramic capacitor according to claim 1, wherein each of the at least one first internal electrode layer and the at least one second internal electrode layer is composed of a single metal or alloy.

6. The multilayer ceramic capacitor according to claim 1, wherein each of the at least one first internal electrode layer and the at least one second internal electrode layer is a sputtered film.

7. The multilayer ceramic capacitor according to claim 1, wherein a thickness of each of the at least one first internal electrode layer and the at least one second internal electrode layer is in a range from 0.05 μm to 0.5 μm.

8. The multilayer ceramic capacitor of claim 1, wherein a main component of the at least one dielectric layer is an oxide ceramic.

9. The multilayer ceramic capacitor according to claim 1, wherein each of the at least one dielectric layer is a sintered body of a coating film.

10. A multilayer ceramic capacitor comprising:
an element body that includes at least one first internal electrode layer, at least one second internal electrode layer, and at least one dielectric layer situated between the at least one first internal electrode layer and the at least one second internal electrode layer, the element body having a plurality of surfaces, the plurality of surfaces including a first surface and a second surface opposite the first surface;
a first external electrode formed on the first surface of the element body and connected to the at least one first internal electrode; and,
a second external electrode formed on the second surface of the element body and connected to the at least one second internal electrode,
wherein each of the at least one first internal electrode layer has a first end exposed in the first surface and extends in a first plane perpendicular to the first surface such that each of the at least one first internal electrode has a greater continuity rate in a first direction toward the first surface than in a second direction perpendicular to the first direction,
wherein each of the at least one second internal electrode layer has a second end exposed in the second surface and extends in a second plane perpendicular to the second surface such that each of the at least one second internal electrode has a greater continuity rate in a third direction toward the second surface than in a fourth direction perpendicular to the third direction.

11. The multilayer ceramic capacitor according to claim 10, wherein the continuity rate of each of the at least one first internal electrode layer in the first direction is equal to or greater than 80% but less than 100%, and the continuity rate of each of the at least one second internal electrode layer in the third direction is equal to or greater than 80% but less than 100%, and
the continuity rate of each of the at least one first internal electrode layer in the second direction is between 70% and 90%, and the continuity rate of each of the at least one second internal electrode layer in the fourth direction is between 70% and 90%.

12. The multilayer ceramic capacitor according to claim 10, wherein the continuity rate of each of the at least one first internal electrode layer in the first direction is 1.1-1.4 times greater than the continuity rate of the first internal electrode layer in the second direction, and
the continuity rate of each of the at least one second internal electrode layer in the third direction is 1.1-1.4 times greater than the continuity rate of the second internal electrode layer in the fourth direction.

13. The multilayer ceramic capacitor according to claim 10,
wherein the continuity rate of the first internal electrode layer in the first direction is an average value of a plurality of continuity rates obtained along a plurality of parallel lines on the first plane in the first direction, and the continuity rate of the first internal electrode layer in the second direction is an average value of a plurality of continuity rates obtained along a plurality of parallel lines on the first plane in the second direction, and wherein the continuity rate of the second internal electrode layer in the third direction is an average value of a plurality of continuity rates obtained along a plurality of parallel lines on the second plane in the third direction, and the continuity rate of the second internal electrode layer in the fourth direction is an average value of a plurality of continuity rates obtained along a plurality of parallel lines on the second plane in the fourth direction.

14. The multilayer ceramic capacitor according to claim 10, wherein the at least one first internal electrode layer includes at least one first fractured portion that factures toward the first surface, and the at least one second internal electrode layer includes at least one second fractured portion that fractures toward the second surface.

15. The multilayer ceramic capacitor according to claim 10,
wherein the number of gaps formed in each of the at least one first internal electrode layer in a first region having a predetermined size in the first direction on the first plane is less than the number of gaps formed in the first internal electrode layer in a second region having the predetermined size in the second direction on the first plane, and
wherein the number of gaps formed in each of the at least one second internal electrode layer in a third region having the predetermined size in the third direction on the second plane is less than the number of gaps formed in the second internal electrode layer in a fourth region having the predetermined size in the fourth direction on the second plane.

16. The multilayer ceramic capacitor according to claim 10, wherein each of the at least one first internal electrode layer contains no ceramic component, and each of the at least one second internal electrode layer contains no ceramic component.

17. The multilayer ceramic capacitor according to claim 10, wherein each of the at least one first internal electrode layer and the at least one second internal electrode layer is composed of a single metal or alloy.

18. The multilayer ceramic capacitor according to claim 10, wherein each of the at least one first internal electrode layer and the at least one second internal electrode layer is a sputtered film.

19. The multilayer ceramic capacitor according to claim 10, wherein a thickness of each of the at least one first internal electrode layer and the at least one second internal electrode layer is in a range from 0.05 μm to 0.5 μm.

20. A multilayer ceramic capacitor comprising:
an element body that includes at least one first internal electrode layer, at least one second internal electrode layer, and at least one dielectric layer situated between the at least one first internal electrode layer and the at least one second internal electrode layer, the element body having a plurality of surfaces, the plurality of surfaces including a first surface and a second surface that is opposite to and parallel to the first surface;
a first external electrode formed on the first surface of the element body and connected to the at least one first internal electrode layer; and,
a second external electrode formed on the second surface of the element body and connected to the at least one second internal electrode layer,
wherein a sheet resistance of each of the at least one first internal electrode layer and each of the at least one second internal electrode layer has anisotropy such that the sheet resistance in a first direction perpendicular to the first and second surfaces is smaller than the sheet resistance in a direction orthogonal to the first direction.

\* \* \* \* \*